Aug. 15, 1950 — W. G. ROSS — 2,518,939
PORTABLE CIRCULAR SAW FOR CUTTING
PLASTER OF PARIS CASTS
Filed Oct. 21, 1946
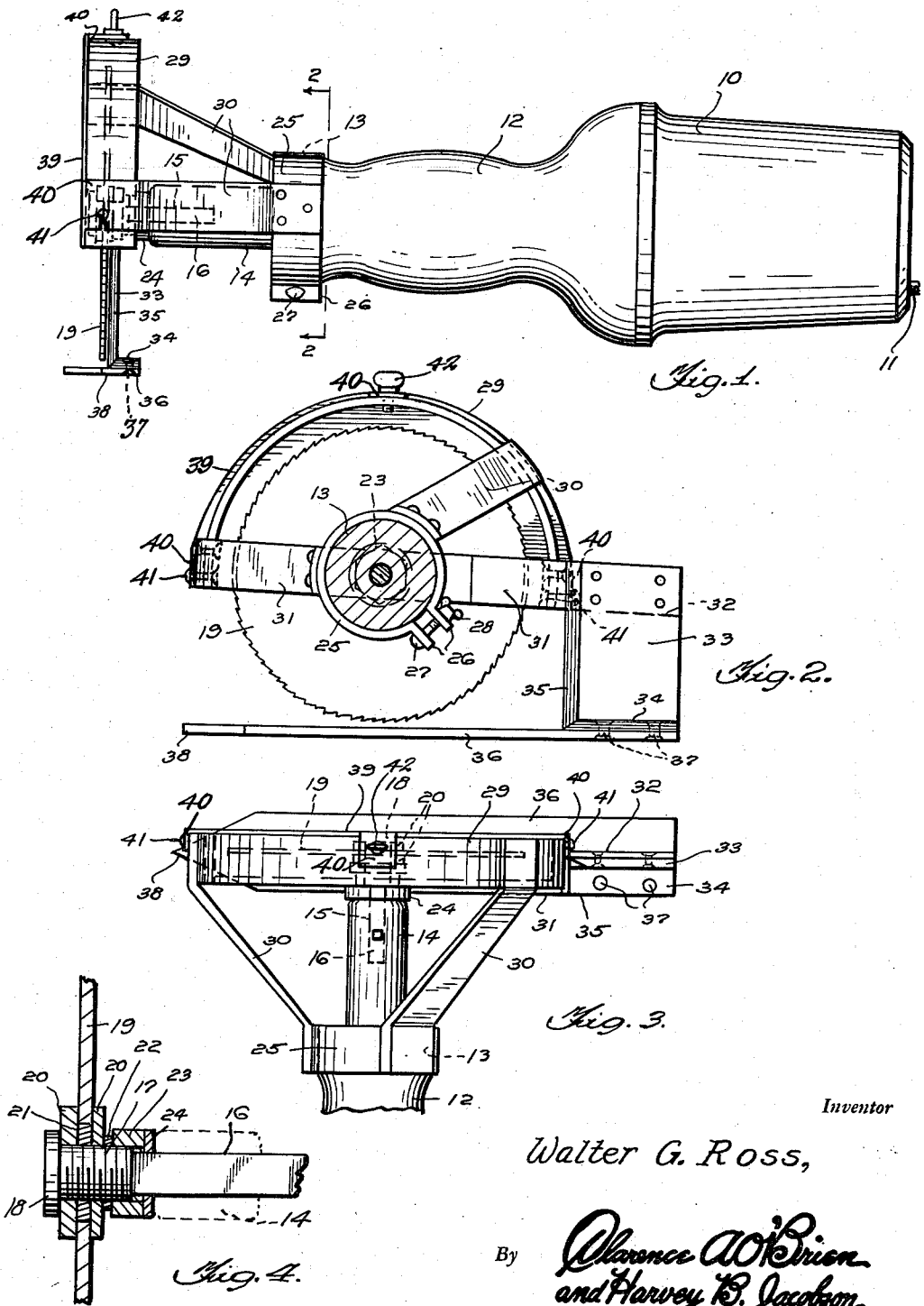
Inventor
Walter G. Ross, Patented Aug. 15, 1950

2,518,939

UNITED STATES PATENT OFFICE 2,518,939

PORTABLE CIRCULAR SAW FOR CUTTING PLASTER OF PARIS CASTS

Walter G. Ross, Milwaukee, Wis., assignor of ten per cent to Arnold R. Ross, Milwaukee, Wis.

Application October 21, 1946, Serial No. 704,757

1 Claim. (Cl. 30—167)

This invention relates to a portable circular saw for cutting plaster of Paris taped casts so that they may be removed from the body, arms and legs of hospitalized patients without injury to the patients.

An object of the invention is to provide a portable cast cutter embodying a motor operated circular saw blade, and provided with a handle supporting a frame which extends over the saw blade, so as to prevent injury or cutting of the operator or patient and which has a guard frame, so designed as to control the depth of cut of the saw through the cast without injury to the patient and to guide and limit the depth of cut of the saw to facilitate removal of the cast, and especially designed to be used in the medical profession for the sole purpose stated, and especially in the orthopedic departments of hospitals with greater advantage than the method now in use.

The object of the invention is to provide an instrument for simplifying the job of removing a cast, with efficiency, so that any ward orderly could operate it, as well as being much safer and quicker in removing casts.

Another object of the invention is to provide a frame, including a guard, adapted to be applied over the circular saw blade mounted on the end of a motor having a handle for manipulating the saw, and also provided with a guide or foot member or portion, to govern the depth of the cut and the entry of the cutting edge of the saw blade into the cast for facilitating its removal.

Other objects and advantages reside in the details of construction and operation as more fully hereinafter described and claimed, reference being had to the accompanying drawings forming part hereof, wherein like numerals refer to like parts throughout, and in which:

Figure 1 is a side elevation of a cast cutter or portable saw constructed in accordance with the invention;

Figure 2 is a sectional view taken on the line 2—2 of Figure 1;

Figure 3 is a top plan view of the structure shown in Figure 2, and

Figure 4 is an enlarged fragmentary sectional view showing the manner of securing the saw blade to the motor shaft.

Referring to the drawings in detail, in which like reference characters designate corresponding parts throughout the several views, 10 designates a motor of the high speed type, of any suitable make, of sufficient horsepower, from which leads an extension cord 11 having a suitable plug designed to be inserted in a wall socket of the house wiring. The motor casing is provided with a handle 12 as a means of conveniently holding the same in one hand, provided with a circular portion 13 at the end thereof, through which the motor shaft 14 extends provided with a circular, square or other shaped socket 15 in which a stub shaft 16 is designed to be held to rotate with the shaft, either by reason of the parts being of polygonal or polysided cross-section where they interfit, held by a set screw or otherwise. The end of the stub shaft 16 is provided with an enlarged threaded portion 17 having a flanged head 18, on which the circular saw blade 19 is designed to be mounted with interposed washers 20 on each side thereof, in connection with a babbitt bearing 21 and held by a lock washer 22 and nut 23 with an interposed washer 24 between the nut and the socketed end of the motor shaft 14.

Mounted upon the circular portion 13 at the end of the handle and motor casing is a split sleeve or collar 25, having apertured ears 26 engaged by a bolt 27 on which a wing nut 28 is engaged, in order to tighten the clamp formed by the split sleeve or collar 25 on the end of the handle.

The guard frame includes a semi-circular or arcuate band 29 over the top of the saw blade and spaced from the periphery or saw tooth edge thereof, which preferably has seven teeth to the inch or otherwise as desired. The band or peripheral guard member 29 is held by a plurality of angular arms 30 extending from the collar 13 in divergent relation to the periphery of the band 29 and attached to or formed integral therewith. One of the arms 30 extends upwardly at an approximately 30 degree angle. The band 29 is mounted upon a rearwardly inclined frame member 31 extending between the lower ends of the band. This frame member is in the form of a pair of arms of angular form, the inner arm extending outwardly as at 32 and having a plate 33 attached thereto in connection with an angular bracket 34 provided with an inwardly beveled front edge 35. The outwardly extending bottom portion 34 of the bracket carries a horizontal guide member or foot 36 in the form of a strip integral with or attached thereto as indicated at 37. The end of the guide or foot 36 is tapered or pointed on opposite sides as indicated at 38, to govern the depth of the cut and facilitate the entry of the saw into the plaster cast, at the opening or space between the frame member 31 and the guide or foot 36 in a direction coextensive with the saw blade or parallel thereto. In this manner, the depth of the cut may be controlled, so as to permit proper sawing or cutting of the plaster cast without injury to the patient. In addition, a sheet metal guard or removable cover 39 may be provided over the frame and the braces 30, with a flange or bent ears 40, mounted by means of keyhole slots or otherwise over headed pins 41 at the sides, and a set screw 42 at the top. In this way, the operator and patient are both protected from the action of the saw.

It will thus be seen that I have provided a cast cutter or saw, for efficiently and quickly cutting plaster casts on patients, in order to remove the casts with facility and dispatch, and without the drudgery of the usual methods employed for removing casts from patients, even if applied to the body, arms or legs. In this way, the device is especially adapted for use by the medical profession, and in hospitals, and may be readily used in the orthopedic departments of hospitals, for removal of casts by a ward orderly. The device is more efficient and much safer and quicker in removing casts, compared with methods now in use, operated by one hand, having the other hand free.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

A portable circular saw for cutting plaster of Paris casts, comprising a straight handle, a rotary electric motor rigidly attached directly to the inner end of said handle, said motor having a drive shaft extending through and beyond the outer end of the handle, a single circular saw blade mounted on the outer end of said drive shaft, an arcuate guard frame mounted on the handle and disposed over the upper portion of said saw blade, a vertical plate rigidly attached to the back of and depending from the guard frame and disposed behind and in the same plane as the saw blade, and a flat narrow elongated foot member fixed to the bottom of said plate and projecting forwardly therefrom beneath the saw blade, said foot member having a pointed front end.

WALTER G. ROSS.

REFERENCES CITED

The following references are of record in the file of this patent:

UNITED STATES PATENTS

| Number | Name | Date |
|---|---|---|
| 1,316,252 | Moering | Sept. 16, 1919 |
| 1,641,505 | Sayre | Sept. 6, 1927 |
| 1,784,337 | Clarke et al. | Dec. 9, 1930 |
| 2,301,264 | Emery | Nov. 10, 1942 |
| 2,319,973 | Broderhausen | May 25, 1943 |
| 2,366,017 | Fortune | Dec. 26, 1944 |